358-86. OR 3,278,677 SR
SEARCH ROOM

Oct. 11, 1966 P. FANNOY 3,278,677

SYSTEM FOR SELECTIVELY INITIATING TELEVISION PROGRAM BY VIEWERS

Filed June 21, 1963 3 Sheets-Sheet 1

INVENTOR
PIERRE FANNOY
BY Richards & Geier
ATTORNEYS

Oct. 11, 1966 P. FANNOY 3,278,677

SYSTEM FOR SELECTIVELY INITIATING TELEVISION PROGRAM BY VIEWERS

Filed June 21, 1963 3 Sheets-Sheet 2

INVENTOR
PIERRE FANNOY

BY Richards & Geier

ATTORNEYS

Oct. 11, 1966 P. FANNOY 3,278,677

SYSTEM FOR SELECTIVELY INITIATING TELEVISION PROGRAM BY VIEWERS

Filed June 21, 1963 3 Sheets-Sheet 3

INVENTOR
PIERRE FANNOY
BY Richards & Geier
ATTORNEYS 3,278,677
Patented Oct. 11, 1966

3,278,677

SYSTEM FOR SELECTIVELY INITIATING TELEVISION PROGRAM BY VIEWERS

Pierre Fannoy, 58 Ave. Winston Churchill, Brussels, Belgium

Filed June 21, 1963, Ser. No. 289,668
Claims priority, application Belgium, May 13, 1963, 632,218
5 Claims. (Cl. 178—6)

This invention relates to a system for selectively transmitting various television programs.

The drawback of present television transmission is that it is carried out without any participation by the recipients. Consequently, it often happens that several television programs which are of interest to a viewer are transmitted at the same time, so that the viewer must give up watching some of the programs which are of interest to him. On other occasions, the viewer is compelled to watch programs in which he is not interested so as to make certain not to miss the one which he really wants to see.

This drawback of lack of coordination between transmitters and viewers is particularly noticeable in the case of educational programs. Such programs are usually transmitted at specified times to all the teaching centers without any consideration of the class arrangements and educational levels in such centers.

An object of the present invention is to eliminate these drawbacks by providing a novel and close relationship between television transmitting stations and viewers.

Other objects will become apparent in the course of the following specification.

In the accomplishment of the objectives of the present invention, it was found advisable to group in a television broadcast station, a substantial number of films, tapes, transparencies and other picture carriers and delivering to subscribers a list of such films, etc. The invention further provides communication means between the television broadcasting station and each subscriber. Each subscriber is provided with means for selecting the desired film and to be able to view it on his own television receiving set at the time selected by him.

This system constituting the subject matter of the present invention may be automatic or semi-automatic.

A fully automatic unit will include in the broadcasting station means responsive to signals received from a subscriber for automatically operating the selected film. Each subscriber must have means communicating to the station information concerning the selected film by the use of a direct cable connection.

A semi-automatic unit will provide a telephone connection between a subscriber and an operator located in the television station, whereby the operator receives the message from the subscriber and places the selected film in the proper location for broadcasting.

The invention will appear more clearly from the following detailed description when taken in connection with the accompanying drawings, showing by way of example preferred embodiments of the inventive idea.

The drawings show a broadcasting station A combined with any suitable number of units B each of which consists of a television set 8 and means selecting a program to be seen on the set.

Figure 1:
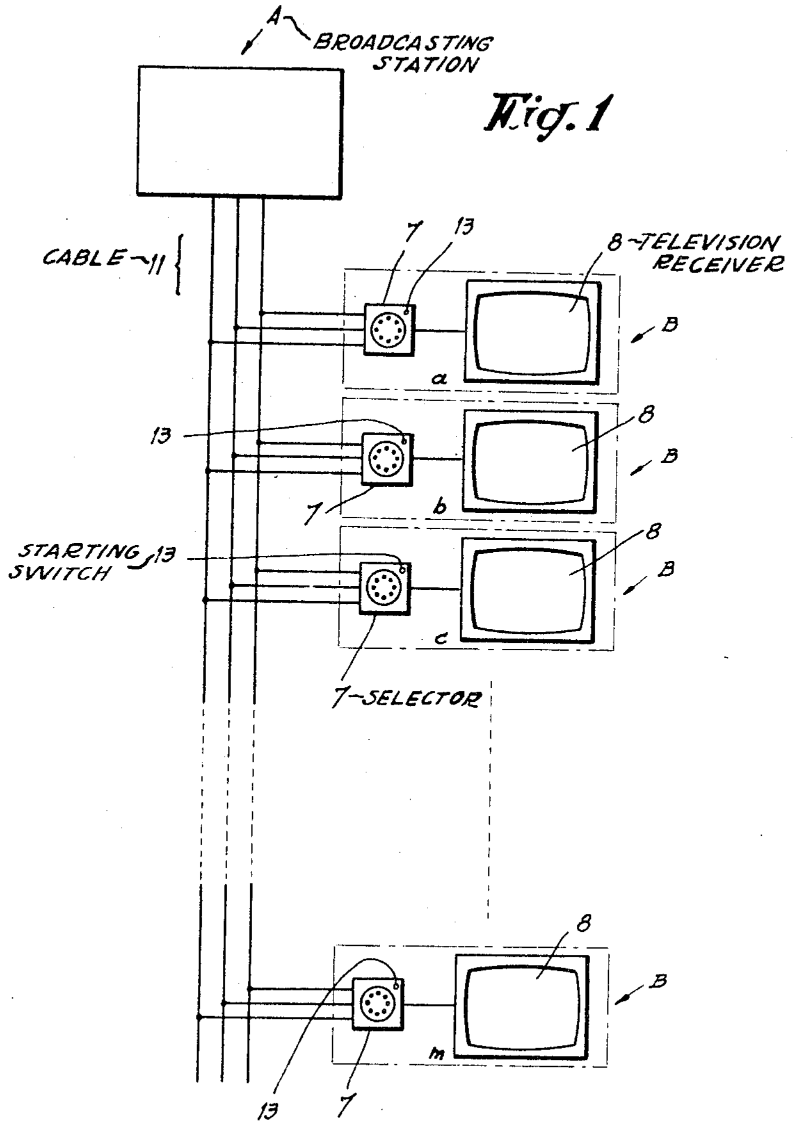
FIG. 1 is a block diagram of a fully automatic system provided with cable connections.
Figure 2:
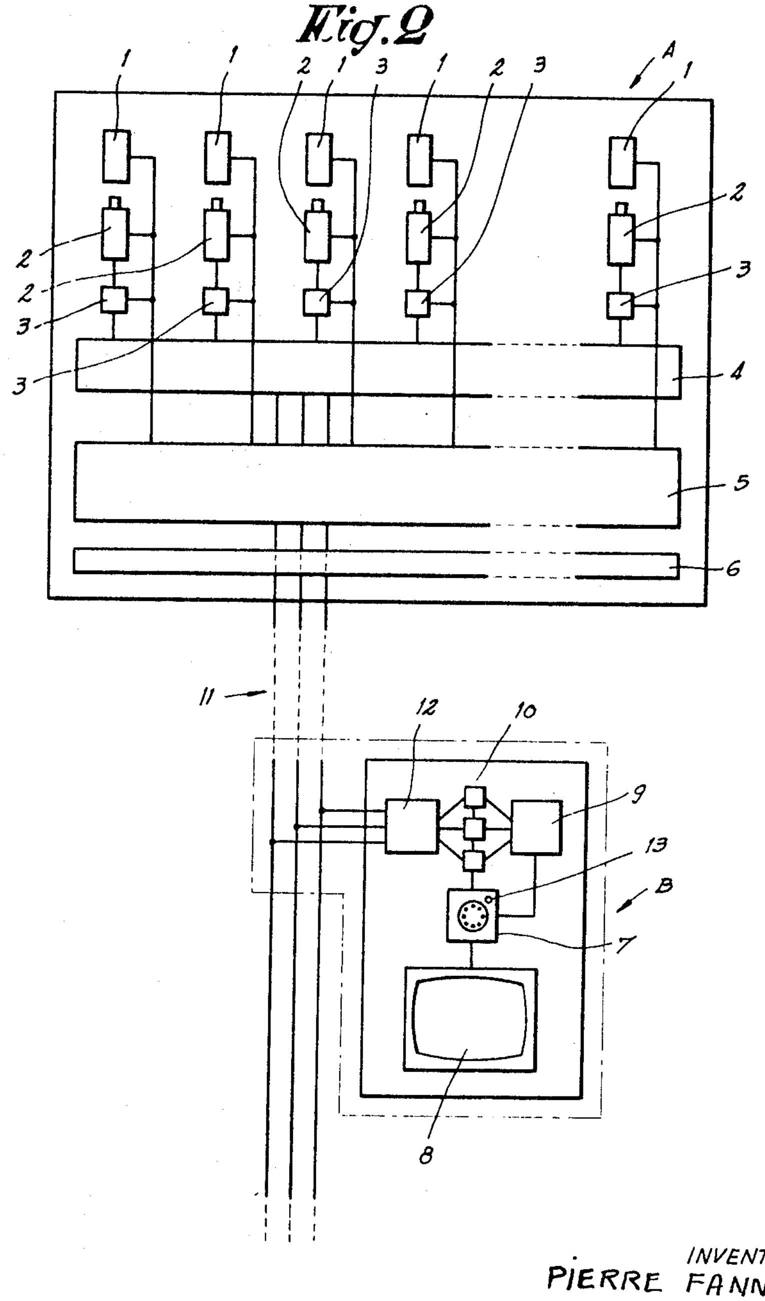
FIG. 2 is a diagram illustrating in greater detail the automatic receiving and transmitting system.

As shown in FIG. 2, the broadcasting station comprises a large number of film reels 1 combined with film reproducers 2, preferably of the magnetic type and channel transmitters 3. The channel transmitters 3 are connected with a channel mixer 4. A film selector 5 is actuated by the subscriber through the use of his own selecting means. A distributor 6 of the lead out cables also constitutes a part of the broadcasting station. All these devices are known per se and are disclosed merely diagrammatically in the drawing.

The films 1 or other broadcasting elements may be placed in storage or in boxes and may be so arranged that the mechanism pertaining to a selected film may be actuated by known remote control means.

If the number of film reproducers 2 is less than the number of films 1, suitable means may be provided for moving the selected film 1 to a particular reproducer. Any suitable film moving means may be used for this purpose.

Each film may also consist of several parts including stationary pictures for educational and other purposes and the selection of the film may be followed by the selection of a specific portion of that film.

The film selectors 5 are actuated by the subscribers. Each subscriber is provided with a selector 7 connected with his usual television set 8. As shown diagrammatically in FIG. 2, each selecting set 7 is connected with a carrier wave oscillator 9 corresponding to a free channel, the frequency being controlled by free channel detectors 10 of the type now generally used in telephone connections. The detectors 10 are connected to a distributing box 12 which is connected to coaxial cables 11 used to provide the connection between the subscribers and the broadcasting section.

While a disc selector 7 is shown in FIG. 2, obviously other selectors of the button or lever type may be used. In the example illustrated, the selector 7 is provided with a starting switch or button 13 which may be operated in the manner similar to that now in general use in telephones.

The operation is as follows:

A subscriber possessing a television set receives from the broadcasting station a list of films or the like which the station possesses and each such film is provided with a specific selecting signal. When the subscriber has selected a film he actuates the button 13 which has the double function of switching on the receiving set 8 and of searching for a free channel through a cable 11. This search is carried out through the detectors 10 and the distributor 12. As soon as a free channel is found the detector 10 stops and a signal is actuated which may be of the visual or audible type. This signal informs the subscriber that he is connected with the broadcasting station A through a free channel which has been located. At that time, the subscriber actuates the selector 7 by turning the dial or by other suitable means so as to transmit to the station A a signal corresponding to the film or the like which the subscriber has selected. The pulses produced by the subscriber are set through the free channel of the corresponding cable 11 to the transmitting station A which automatically selects the required film, starts this film and sends it through a high frequency transmitter to the free channel.

The selection of the film can be carried out by any suitable electronic, magnetic or electro-mechanical means known in the art. The switching on of the selected film and of the corresponding reproducer may be also used to close the transmitter circuit by connecting it to the free channel.

When the broadcast is at an end, the transmission stops automatically and it is possible to indicate the end of the transmission by a visual and/or audible signal. Then the receiving set can be switched off automatically.

Obviously, the above-described devices can be conviently adapted to any specific local requirements. For example, should it be found that as a rule only ten programs need be sent simultaneously, a single coaxial cable would be sufficient. On the other hand, the number of coaxial cables to which the subscribers are connected in parallel can be conveniently multiplied should it be desired to send more than ten cables.

By way of example, each channel could have a band width of 7 mcs. with a distance of 1 mc. between the channels. The free channel detector 10 at the subscriber's set searches for a channel where there is no transmission, that is, when there is no frequency peculiar to that channel the detector would stop at that channel. When the detector stops, the oscillator 9 fills this channel automatically with its corresponding frequency so that from then on this channel will be busy for all other subscribers.

This carrier frequency will be used for transmitting pulses corresponding to the actuation of the selector 7, that is, also corresponding to the number of the selected film. As soon as these pulses reach the film selector 5 it will be automatically actuated and connected with the apparatus corresponding to the selected film so that the broadcasting will start. It should be noted that the oscillator 9 will stop operating as soon as the transmission of the image has begun. At the end of the broadcasting the channel engaged by the oscillator is freed so that it may be used by another or the same subscriber.

Figure 3:
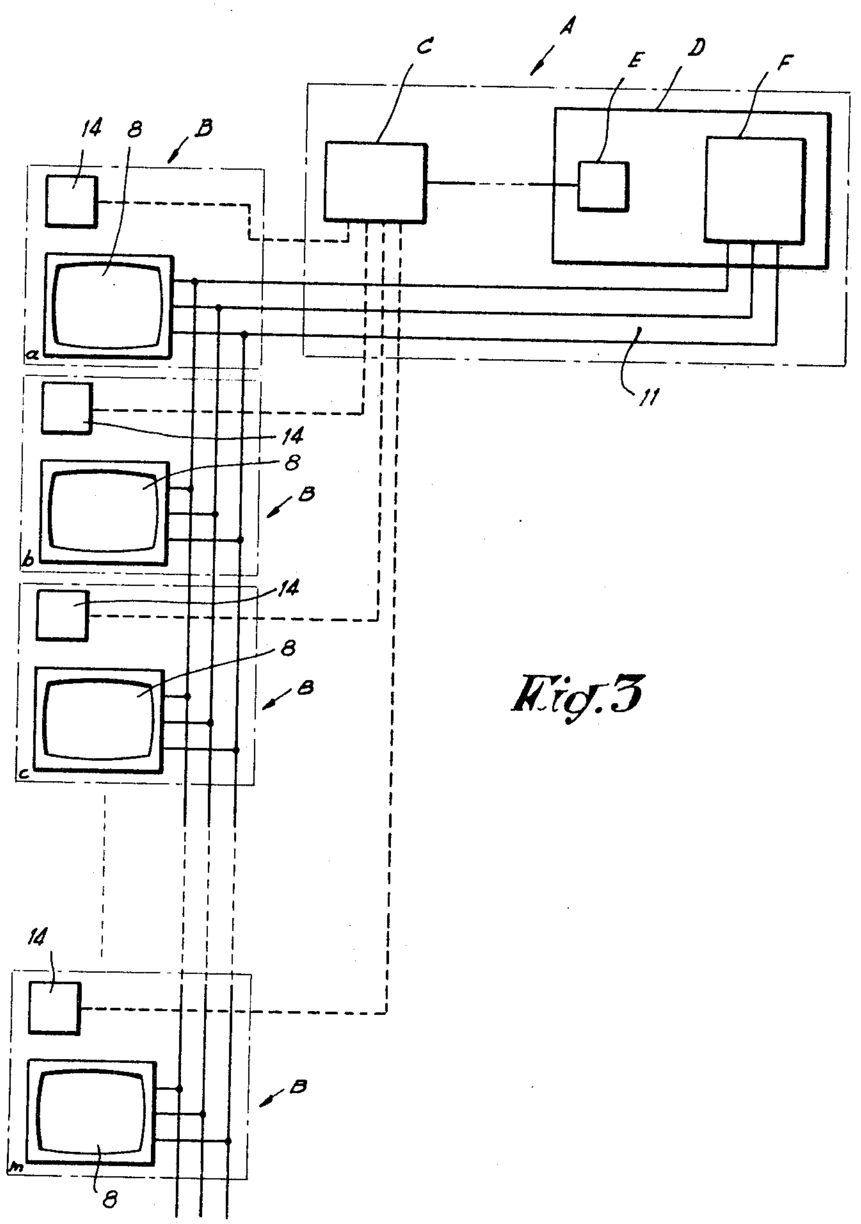
FIG. 3 is a block diagram of a semiautomatic system provided with telephone lines.

FIG. 3 shows a semiautomattic system wherein the selection by the subscriber is made by means of a telephone call, which necessitates the use of one or several operators at the transmitting station. A unit of this type can be arranged with substantially lower cost.

In a system of this type the subscriber may use either the regular telephone or he may be connected to a special network which connects directly the transmitting station to the subscriber.

As shown in FIG. 3, the transmitting station A is divided in that case into a telephone station C and a film and information transmitting station D. The station D is composed of two parts, namely, the operator set E and an equipment F for transmitting films and information.

Each subscriber unit B includes a television receiving set 8 and a telephone set 14 which replaces the automatic selector of the previously described embodiment.

In the construction shown in FIG. 3, the transmitting equipment of the broadcasting station is connected to the subscriber sets B through three coaxial cables 11. Since each cable can have ten channels this arrangement would make possible the simultaneous sending of 30 programs.

Of course, even in a semiautomatic embodiment of this type, it is convenient to provide a code between the subscribers and the operator in the broadcasting station so as to facilitate the quick selection of the desired film or the like.

It is apparent that the above-described examples are capable of a large number of variations and modifications without exceeding the scope of the present invention.

What I claim is:

1. A system for automatically and selectively starting from any one of a plurality of substations the emission of any of a plurality of television programs in a transmission station, said system including a cable connection between the transmitting station and the substations, each substation including a television set coupled to said cable connection, means generating selecting signals for said television programs, and means transmitting said selecting signals to said transmitting station, said transmitting means being coupled to said cable connection and being controlled by said generating means, the transmitting station including a plurality of sources of said television programs, means coupled to said cable connection for transmitting the programs of said sources to said substations through said cable connection, means coupled with said cable connection for receiving said selecting signals from said substations and for accordingly controlling corresponding television program sources, transmitting means for the programs of these sources, a transmission channel mixer and a cable distributing box wherein said transmitting means of said transmitting station are coupled to said cable connection through said transmission channel mixer and said cable distribution box, and wherein said transmitting means of each substation includes a modulator for modulating a carrier wave by said selecting signals, means coupled with said modulator, a free channel selector, and a cable distribution box which is coupled in series with said free channel selector between said cable connection, said television receiver and said modulator.

2. A system as claimed in claim 1, wherein said means for generating selecting signals include a keyboard by means of which it is possible to select said television programs.

3. A system as claimed in claim 1, wherein said means for generating selecting signals include a dial by means of which it is possible to select said television programs.

4. A system as claimed in claim 1, which includes a first number of television program carriers and a second number of reproducer means of said television program carriers, each carrier being associated to a reproducer in order to form said source of television programs.

5. A system as claimed in claim 4, wherein said first number is larger than said second number, said system further including means producing a relative movement between said carrier and said reproducer means under the control of said selecting signals in order to associate a carrier to a reproducer.

References Cited by the Examiner

UNITED STATES PATENTS

| | | | |
|---|---|---|---|
| 2,031,075 | 2/1936 | Scheibell | 178—6 |
| 3,050,579 | 8/1962 | Nash et al. | 178—6 |
| 3,104,280 | 9/1963 | Akrell | 178—5.1 |
| 3,106,604 | 8/1963 | Shanahan | 178—5.1 |
| 3,121,216 | 2/1964 | Wolfe et al. | 178—6.6 |
| 3,125,644 | 3/1964 | Lyon | 178—6.6 |
| 3,188,615 | 6/1965 | Wilcox | 178—6.6 |

DAVID G. REDINBAUGH, *Primary Examiner.*

R. L. RICHARDSON, *Assistant Examiner.*